(12) United States Patent
Taniguchi

(10) Patent No.: US 10,415,643 B2
(45) Date of Patent: Sep. 17, 2019

(54) ROLLING BEARING

(71) Applicant: JTEKT CORPORATION, Osaka-shi, Osaka (JP)

(72) Inventor: Youzou Taniguchi, Toyota (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/926,092

(22) Filed: Mar. 20, 2018

(65) Prior Publication Data

US 2018/0274593 A1 Sep. 27, 2018

(30) Foreign Application Priority Data

Mar. 27, 2017 (JP) .................................. 2017-061576

(51) Int. Cl.
| | | |
|---|---|---|
| *F16C 33/78* | (2006.01) | |
| *F16C 19/06* | (2006.01) | |
| *F16C 33/58* | (2006.01) | |

(52) U.S. Cl.
CPC .......... *F16C 33/7823* (2013.01); *F16C 19/06* (2013.01); *F16C 33/583* (2013.01); *F16C 33/7826* (2013.01); *F16C 33/7856* (2013.01); *F16C 33/7853* (2013.01); *F16C 2240/30* (2013.01)

(58) Field of Classification Search
CPC ................ F16C 33/782; F16C 33/7826; F16C 33/7853; F16C 33/7856; F16C 33/7866; F16J 15/025; F16J 15/3204
See application file for complete search history.

(56) References Cited

U.S. PATENT DOCUMENTS

2015/0247533 A1* 9/2015 Fickert-Guenther ........................ F16C 33/7823
384/480
2016/0153497 A1* 6/2016 Nakai .................. F16J 15/3232
384/484

FOREIGN PATENT DOCUMENTS

| JP | 2007-192363 | * | 8/2007 |
| JP | 2013-152017 | * | 8/2013 |
| JP | 2016-166655 A | | 9/2016 |

* cited by examiner

*Primary Examiner* — James Pilkington
(74) *Attorney, Agent, or Firm* — Oliff PLC

(57) ABSTRACT

A rolling bearing includes a seal device provided at an axial end portion of an annular space formed between an inner ring and an outer ring. The seal device has a seal body portion attached to the outer ring, and a seal lip provided so as to extend from the seal body portion toward the inner ring and configured to contact a seal surface of the inner ring. The seal lip has a lip base portion that extends from the seal body portion toward the inner ring, a lip middle portion that extends from the lip base portion in a different direction, and a lip tip portion that extends from the lip middle portion toward the inner ring in a different direction and that contacts the seal surface.

6 Claims, 6 Drawing Sheets

ROLLING BEARING

INCORPORATION BY REFERENCE

The disclosure of Japanese Patent Application No. 2017-061576 filed on Mar. 27, 2017 including the specification, drawings and abstract, is incorporated herein by reference in its entirety.

BACKGROUND OF THE INVENTION

1. Field of the Invention

The present invention relates to a rolling bearing.

2. Description of Related Art

Foreign matter contained in lubricating oil enters a rolling bearing in the case where the rolling bearing is used in a housing in which the lubricating oil is accumulated, for example. If the foreign matter is caught between a raceway surface of an inner ring or an outer ring and a rolling surface of a rolling element, peeling may be caused on the raceway surface or the rolling surface, for example, to reduce the bearing life. Examples of the rolling bearing used in such an environment include bearings for transmission devices for automobiles.

Then, in the related art, as illustrated in FIG. 6, seal devices 96 are provided at axial end portions of an annular space S formed between an inner ring 99 and an outer ring 95 (see Japanese Patent Application Publication No. 2016-166655 (JP 2016-166655 A), for example). The seal devices 96 prevent entry of foreign matter into the bearing inside portion, in which rolling elements (balls 100) are present, from the bearing outside portion.

The seal devices 96 according to the related art each have a seal body portion 94 and a seal lip 90. The seal body portion 94 is attached to the outer ring 95 which serves as a stationary ring. The seal lip 90 is formed from an elastic body that extends from the seal body portion 94 toward the inner ring 99 which serves as a rotary ring. The seal lip 90 contacts a seal surface 91 of the inner ring 99. Therefore, when the inner ring 99 is rotated, the seal lip 90 slides over the seal surface 91 to cause a rotational resistance of the rolling bearing.

In order to reduce the rotational resistance of the rolling bearing, a length L of the seal lip 90 may be increased. As the seal lip 90 is made longer, the tension force of a lip distal end 90a of the seal lip 90 with the seal surface 91 can be reduced to reduce the rotational resistance.

In the case where there is only a limited space to provide the seal lip 90, however, it is difficult to increase the length of the seal lip 90. Thus, the seal lip 90 can be made longer by deepening a seal groove 98 formed at an axial end portion of the inner ring 99, that is, forming the seal surface 91 on the radially inner side. In this case, however, a side surface 97 of the inner ring 99 receives an axial load that acts on the bearing. Therefore, the area of the side surface 97 is made smaller, and the axial load may not be fully received.

SUMMARY OF THE INVENTION

It is an object of the present invention to provide a rolling bearing in which a rotational resistance caused when a seal device contacts a rotary ring can be reduced even if there is only a limited space to provide a seal lip.

An aspect of the present invention provides a rolling bearing including a seal device provided at an axial end portion of an annular space formed between an inner ring and an outer ring, one of the inner ring and the outer ring serving as a rotary ring and the other serving as a stationary ring, in which: the seal device has a seal body portion attached to the stationary ring, and a seal lip provided so as to extend from the seal body portion toward the rotary ring and configured to contact a seal surface of the rotary ring; and the seal lip has a lip base portion that extends from the seal body portion toward the rotary ring, a lip middle portion that extends from the lip base portion in a direction that is different from a direction in which the lip base portion extends, and a lip tip portion that extends from the lip middle portion toward the rotary ring in a direction that is different from the direction in which the lip middle portion extends and that has a lip distal end that contacts the seal surface.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIGS. 4A and 4B illustrate a lip tip portion, in which FIG. 4A illustrates a first example and FIG. 4B illustrates a second example;

FIGS. 5A and 5B illustrate a seal lip, in which FIG. 5A illustrates a third example and FIG. 5B illustrates a fourth example.

DETAILED DESCRIPTION OF EMBODIMENTS

Figure 1:
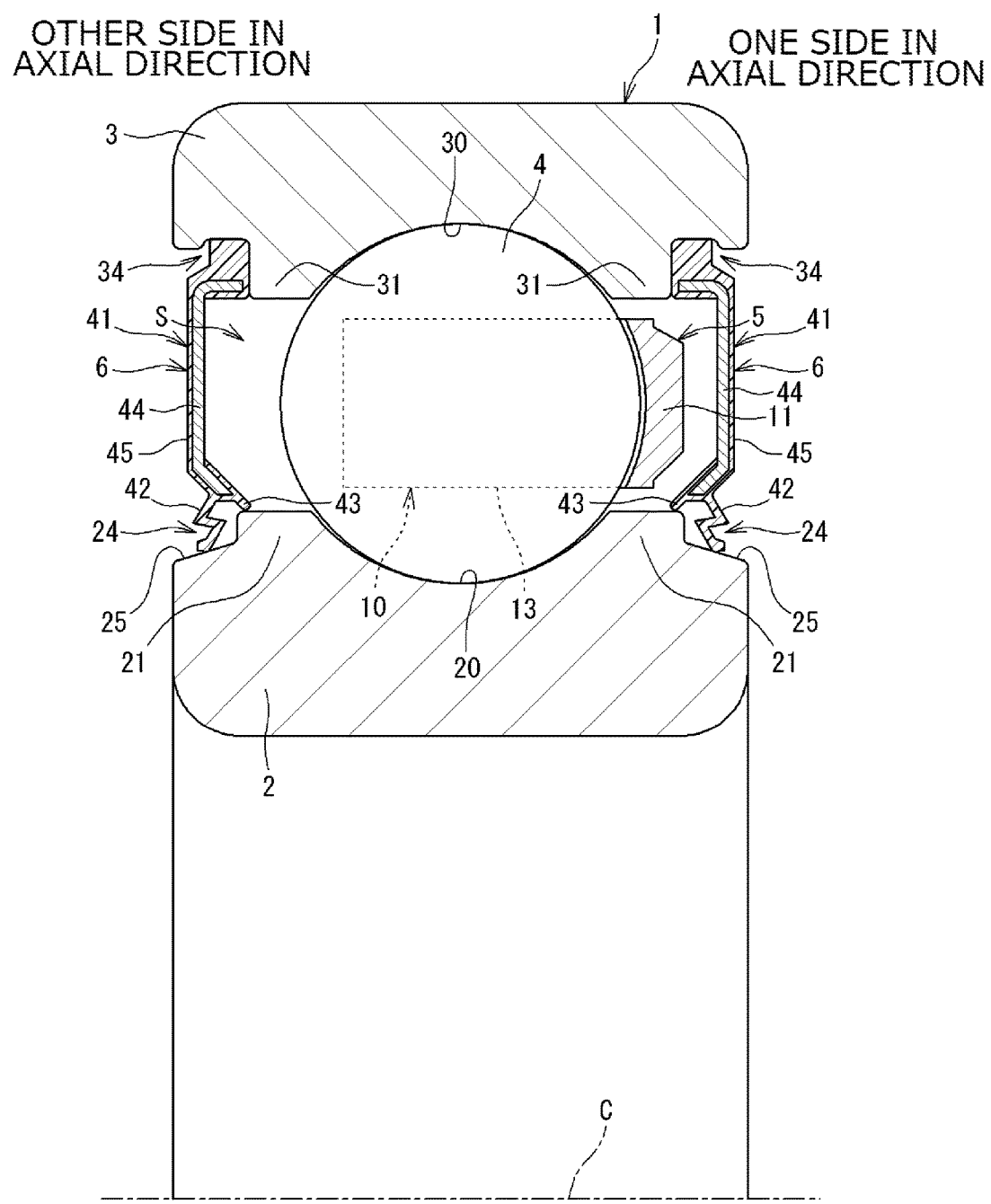
FIG. 1 is a sectional view illustrating a rolling bearing according to an embodiment of the present invention.

FIG. 1 is a sectional view illustrating a rolling bearing according to an embodiment of the present invention. A rolling bearing 1 includes an inner ring 2, an outer ring 3, a plurality of rolling elements, an annular cage 5, and seal devices 6. In the present embodiment, the rolling elements are balls 4, and the rolling bearing 1 is a ball bearing. The seal devices 6 are provided at both axial end portions of an annular space S formed between the inner ring 2 and the outer ring 3. In the rolling bearing 1 illustrated in FIG. 1, the inner ring 2 serves as a rotary ring that is rotated together with a shaft (not illustrated). The outer ring 3 serves as a stationary ring attached to a housing (not illustrated).

In the following description, the right side of the rolling bearing 1 illustrated in FIG. 1 is defined as one side in the axial direction, and the left side of the rolling bearing 1 is defined as the other side in the axial direction. A region of the annular space S in which the balls 4 are present is referred to as a bearing inside portion, and a region of the annular space S on one side and the other side in the axial direction, opposite to the bearing inside portion, is referred to as a bearing outside portion. Therefore, when describing a first seal device 6 on one side in the axial direction (right side in FIG. 1), one side in the axial direction corresponds to the bearing outside portion, and the other side in the axial direction corresponds to the bearing inside portion. When describing a second seal device 6 on the other side in the axial direction (left side in FIG. 1), one side in the axial direction corresponds to the bearing inside portion, and the other side in the axial direction corresponds to the bearing outside portion.

An inner ring raceway surface 20 on which the balls 4 roll is formed in the outer peripheral surface of the inner ring 2. The inner ring 2 has inner ring shoulder portions 21 on both sides in the axial direction across the inner ring raceway surface 20. Seal grooves 24, which are recessed peripheral grooves, are formed at both axial end portions of the inner ring 2. An outer ring raceway surface 30 on which the balls 4 roll is formed in the inner peripheral surface of the outer ring 3. The outer ring 3 has outer ring shoulder portions 31 on both sides in the axial direction across the outer ring raceway surface 30. Attachment grooves 34, which are recessed peripheral grooves, are formed at both axial end portions of the outer ring 3. The plurality of balls 4 are interposed between the inner ring 2 and the outer ring 3. When the inner ring 2 and the outer ring 3 are rotated relative to each other (when the inner ring 2 is rotated in the present embodiment), the balls 4 roll on the inner ring raceway surface 20 and the outer ring raceway surface 30 while being held by the cage 5.

The cage 5 can hold the plurality of balls 4 at predetermined intervals (equal intervals) along the circumferential direction. To this end, a plurality of pockets 10 for accommodating the balls 4 are formed in the cage 5 along the circumferential direction. The cage 5 has an annular body (annular portion) 11 and a plurality of prongs (cage bars) 13. The annular body 11 is provided on one side of the balls 4 in the axial direction. The prongs (cage bars) 13 are provided so as to extend from the annular body 11 toward the other side in the axial direction. Spaces on the other side of the annular body 11 in the axial direction and between the prongs 13 and 13 which are adjacent to each other in the circumferential direction constitute the pockets 10 for accommodating the balls 4. The cage 5 is a so-called crown-shaped cage, and the pockets 10 open toward the other side in the axial direction.

The first seal device 6 and the second seal device 6 are identical to each other, although attached in opposite directions. The specific configuration of the seal device 6 will be described using the first seal device 6 (hereinafter referred to simply as the seal device 6) as a representative example. The seal device 6 has a function of preventing a lubricant (grease) in the bearing inside portion, in which the balls 4 are provided, from leaking to the outside, and preventing entry of foreign matter in the bearing outside portion into the bearing inside portion. The rolling bearing 1 adopts grease lubrication.

The seal device 6 has a seal body portion 41 attached to the outer ring 3, and a (first) seal lip 42 provided so as to extend from the seal body portion 41 toward the inner ring 2. The seal lip 42 contacts a seal surface 25 of the inner ring 2. The seal device 6 according to the present embodiment also has a second seal lip 43. The seal body portion 41 is constituted of a core metal 44 made of metal, and a covering portion 45 fixed to the core metal 44. The seal lips 42 and 43 extend from an end portion of the covering portion 45 on the inner ring 2 side toward the inner ring 2. The covering portion 45 and the seal lips 42 and 43 are made of rubber, and vulcanization-bonded to the core metal 44. An end portion of the covering portion 45 on the outer ring 3 side is fitted into the attachment groove 34 of the outer ring 3. Consequently, the seal device 6 is fixed to the outer ring 3.

The first seal lip 42 contacts the seal surface 25 of the seal groove 24 of the inner ring 2. Consequently, the first seal lip 42 has a function of preventing entry of foreign matter from the bearing outside portion and outflow of grease in the bearing inside portion. The second seal lip 43 has a function of preventing entry of foreign matter and outflow of grease in the bearing inside portion between the outer peripheral surface of the inner ring shoulder portion 21.

Figure 2:
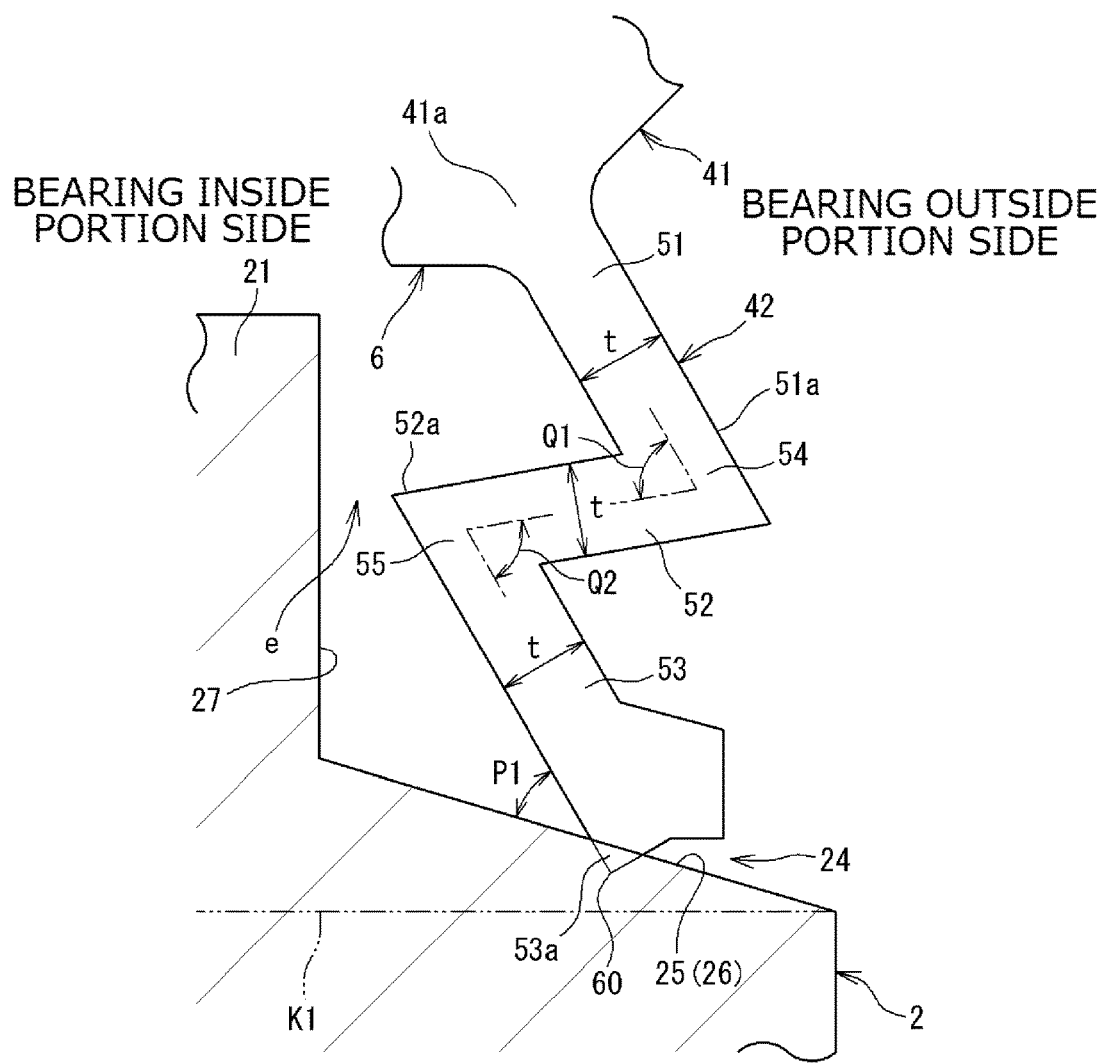
FIG. 2 is a sectional view of a first seal lip and a seal groove.

FIG. 2 is a sectional view of the first seal lip 42 and the seal groove 24. The seal groove 24 is formed at an axial end portion (an end portion on the bearing outside portion side) of the inner ring 2, and has a groove bottom surface 26 and a groove side surface 27 on the bearing inside portion side with respect to the groove bottom surface 26. The groove bottom surface 26 is an inclined surface that extends away from the seal body portion 41 toward the bearing outside portion. That is, the groove bottom surface 26 is a surface inclined with respect to a virtual line K1 that is parallel to a central axis C (see FIG. 1) of the rolling bearing 1. The groove bottom surface 26 is a tapered surface with an outside diameter that gradually becomes smaller toward the bearing outside portion. The groove side surface 27 is an annular surface that faces the axial direction and that is orthogonal to the virtual line K1. The groove bottom surface 26 serves as the seal surface 25. That is, the seal lip 42 (a lip tip portion 53 to be discussed later) contacts the groove bottom surface 26. The seal lip 42 (a lip middle portion 52 to be discussed later) makes no contact with the groove side surface 27 with a clearance e in the axial direction provided therebetween. The clearance e is set such that the seal lip 42 makes no contact with the groove side surface 27 even if the inner ring 2 and the outer ring 3 are displaced relative to each other in the axial direction when an axial load acts on the rolling bearing 1 (see FIG. 1) or the like.

In FIG. 2, the seal lip 42 is provided so as to extend from the seal body portion 41 side toward the seal surface 25 (groove bottom surface 26). The seal lip 42 has a lip base portion 51, a lip middle portion 52, and a lip tip portion 53 arranged in this order from the seal body portion 41 side. The lip base portion 51 extends from an end portion 41a of the seal body portion 41 on the inner ring 2 side toward the inner ring 2. The lip middle portion 52 extends from an end portion 51a of the lip base portion 51 on the inner ring 2 side, and extends in a direction that is different from the direction in which the lip base portion 51 extends. The lip tip portion 53 extends from an end portion 52a of the lip middle portion 52 on the inner ring 2 side, and extends in a direction that is different from the direction in which the lip middle portion 52 extends. A lip distal end 60 contacts the seal surface 25. In this way, the seal lip 42 has a stepped shape with a plurality of bent portions (two bent portions in the present embodiment). A coupling portion 54 between the lip base portion 51 and the lip middle portion 52 serves as a first bent portion. A coupling portion 55 between the lip middle portion 52 and the lip tip portion 53 serves as a second bent portion.

The lip base portion 51 is shaped to extend from the bearing inside portion side toward the bearing outside portion as the lip base portion 51 extends away from the seal body portion 41 (i.e. toward the radially inner side). The lip middle portion 52 is shaped to extend such that the coupling portion 54 with the lip base portion 51 is positioned on the bearing outside portion side and the coupling portion 55 with the lip tip portion 53 is positioned on the bearing inside portion side. The lip tip portion 53 is shaped to extend from the bearing inside portion side toward the bearing outside portion as the lip tip portion 53 extends closer to the seal surface 25 (i.e. toward the radially inner side). The lip distal end 60 of the lip tip portion 53 contacts the seal surface 25 such that the lip tip portion 53 makes an inclination angle P1 with respect to the seal surface 25.

The contact angle (inferior angle) of the lip tip portion 53 with respect to the seal surface 25 is referred to as a lip angle. The lip angle (inclination angle P1) is preferably less than 60 degrees, particularly preferably less than 45 degrees. The lip base portion 51, the lip middle portion 52, and the lip tip portion 53 are each shaped to extend straight. The lip base portion 51, the lip middle portion 52, and the lip tip portion 53 (excluding a distal end portion 53a of the lip tip portion 53) have a constant thickness t.

Figure 3:
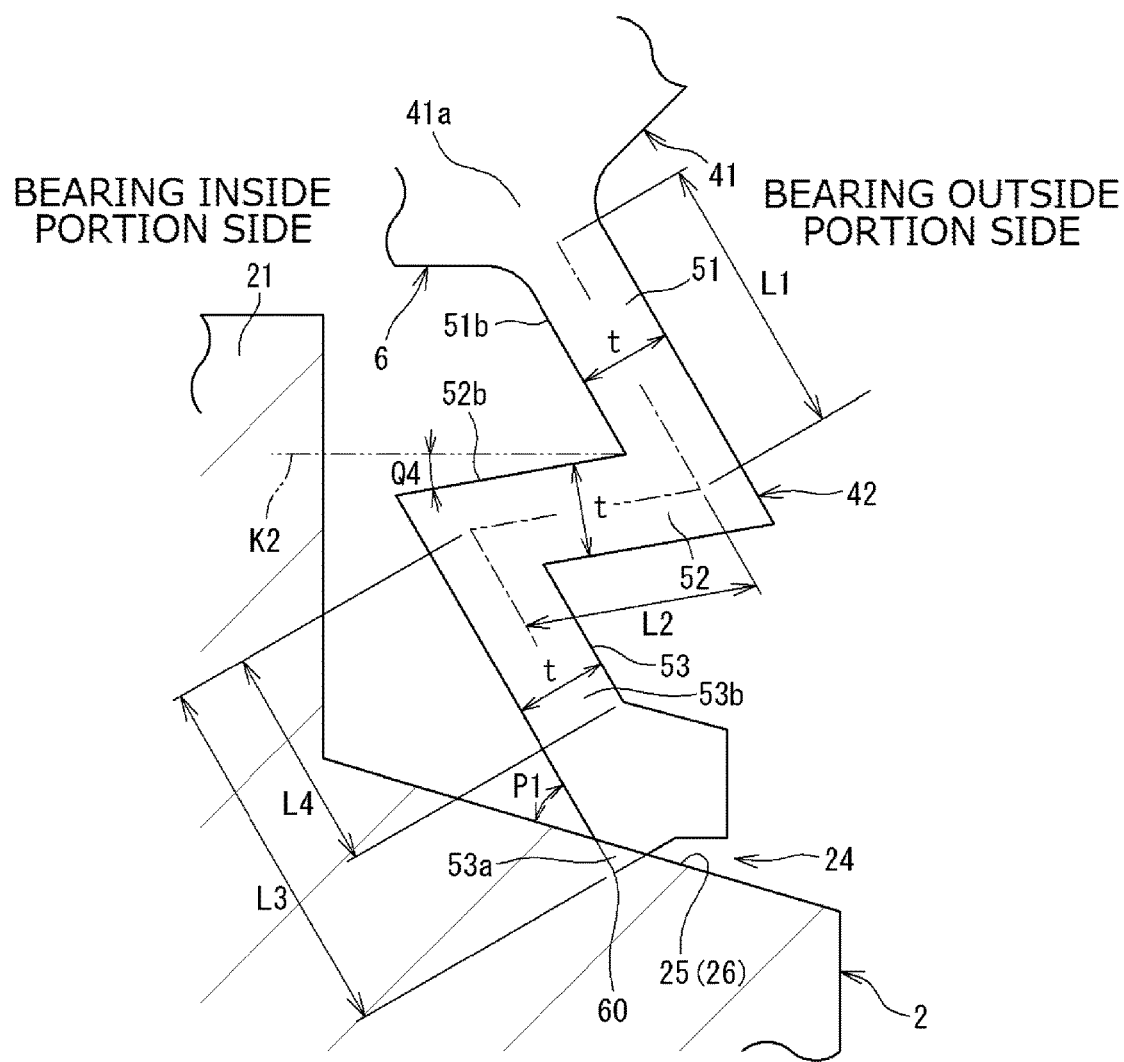
FIG. 3 is a sectional view of the first seal lip and the seal groove.

When the lip tip portion 53 (the lip distal end 60 thereof) contacts the seal surface 25, the seal lip 42 is elastically deformed as a whole. Along with the deformation, the lip tip portion 53 contacts the seal surface 25 with an interference (margin for collapse). In the present embodiment, the distal end portion 53a, which is a portion of the lip tip portion 53 closest to the inner ring 2, has a bulged shape with an increased thickness t. Therefore, the distal end portion 53a is more rigid than the other portions. Consequently, the width of contact between the distal end portion 53a (lip distal end 60) and the seal surface 25 can be prevented from becoming excessively large. In contrast, respective straight portions of the lip base portion 51, the lip middle portion 52, and the lip tip portion 53 with a constant thickness t are thinner and less rigid, and thus can be elastically deformed flexibly. Therefore, the contact surface pressure (tension force) of the seal lip 42 with the seal surface 25 is reduced. As illustrated in FIG. 3, the lip base portion 51 has a constant thickness t over the overall length (length L1). The lip middle portion 52 also has a constant thickness t over the overall length (length L2).

Figure 6:
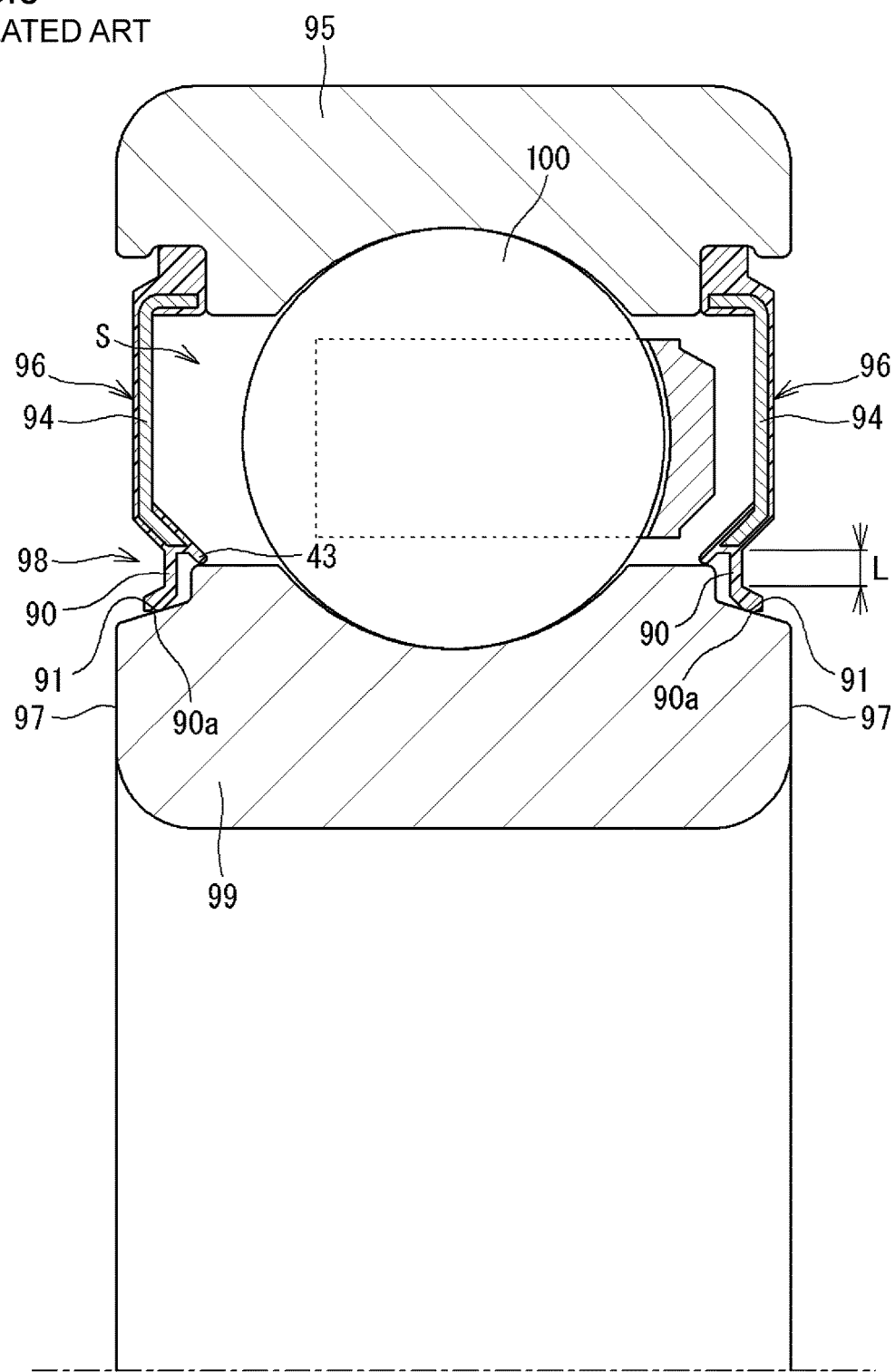
FIG. 6 is a sectional view illustrating a rolling bearing according to the related art.

If the length of the lip base portion 51 is defined as L1, the length of the lip middle portion 52 is defined as L2, and the length of the lip tip portion 53 is defined as L3, the total (L1+L2+L3) of such lengths corresponds to the overall length of the seal lip 42. When the total (L1+L3) of the lengths of the lip base portion 51 and the lip tip portion 53 is compared with the seal lip 90 according to the related art (see FIG. 6), in particular, the length of the seal lip 42 according to the present embodiment is larger than the lip length according to the related art. Each of the lengths L1, L2, and L3 is the length of each portion along the center line which passes through the center in the thickness direction. Since the seal lip 42 is longer, the tension force of the seal lip 42 with the seal surface 25 can be reduced. In the case of the present embodiment, a portion (straight portion) 53b of the lip tip portion 53 excluding the distal end portion 53a, which has a bulged shape, contributes to reducing the tension force. The straight portion 53b has a length L4. The total (L1+L4) of the lengths of the lip base portion 51 and the straight portion 53b of the lip tip portion 53 can also be made larger than the lip length L according to the related art.

In FIG. 2, the lip angle which is the angle between the seal surface 25 and the lip tip portion 53 is an acute angle of less than 60 degrees. The lip angle is the inclination angle P1. The lip angle is not the actual angle of intersection between the lip tip portion 53, which is in contact with the seal surface 25 and has been elastically deformed, and the seal surface 25. The lip angle is the angle of intersection in design between the seal lip 42 in the natural state (which has not been elastically deformed) and the inner ring 2 in a sectional surface (see FIGS. 1, 2, and 3) including the central axis C of the rolling bearing 1. As described later, if the lip angle (inclination angle P1) is smaller, the amount of deformation of the lip tip portion 53 can be made smaller. As a result, the tension force with the seal surface 25 is reduced. Therefore, in the present embodiment, the lip angle is made as small as possible.

A (first) bend angle Q1 between the lip base portion 51 and the lip middle portion 52 is an acute angle of less than 90 degrees. A (second) bend angle Q2 between the lip middle portion 52 and the lip tip portion 53 is an acute angle of less than 90 degrees. In the present embodiment, the first and second bend angles Q1 and Q2 are each an angle of 70 degrees. In order to make the seal lip 42 compact and reduce the tension force of the seal lip 42, the first and second bend angles Q1 and Q2 are each preferably an angle of about 60 to 80 degrees (as described later).

In the rolling bearing 1 configured as described above, as illustrated in FIG. 2, the seal lip 42 of the seal device 6 has a stepped shape with two bent portions (coupling portions 54 and 55). The seal groove 24 serves as an installation space for the seal lip 42. Even if this space (seal groove 24) is small, the seal lip 42 can be made longer because of the stepped shape. If the seal lip 42 is longer, the tension force of the seal lip 42 with the seal surface 25 can be reduced. Consequently, with the seal device 6 according to the present embodiment, the rotational resistance of the rolling bearing 1 which is caused with the seal lip 42 contacting the inner ring 2 (seal surface 25) can be reduced.

Figure 4A:
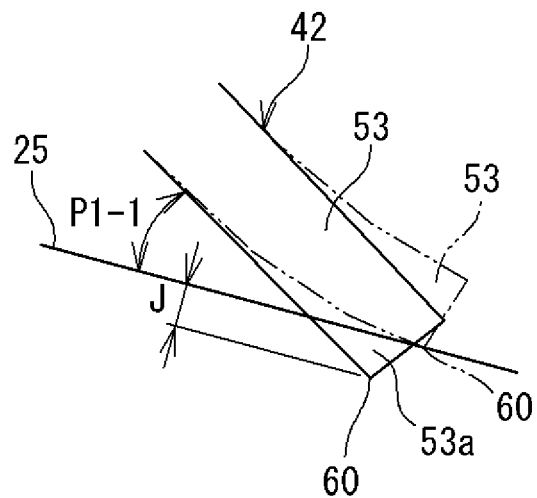
Figure 4B:
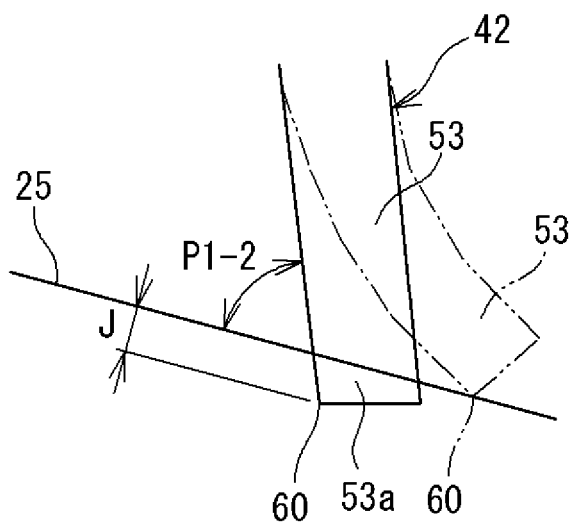

FIGS. 4A and 4B illustrate the lip tip portion 53. FIG. 4A illustrates a first example, and FIG. 4B illustrates a second example. In FIGS. 4A and 4B, when the lip distal end 60 of the lip tip portion 53 contacts the seal surface 25, the lip tip portion 53 is elastically deformed. The state before the deformation (natural state) is indicated by a continuous line, and the state after the deformation is indicated by a long dashed double-short dashed line. In FIGS. 4A and 4B, the bulged shape of the distal end portion 53a is not illustrated. A lip angle (inclination angle) P1-1 of the lip tip portion 53 with respect to the seal surface 25 in the first example illustrated in FIG. 4A is smaller than a lip angle P1-2 in the second example illustrated in FIG. 4B (P1-1<P1-2). In the first example and the second example, an interference (margin for collapse) J of the lip tip portion 53 is the same, but the amount of elastic deformation of the lip tip portion 53 is different because of the different lip angles (P1-1 and P1-2). That is, in the case where the interference (margin for collapse) J is the same, the amount of elastic deformation of the lip tip portion 53 is smaller in the first example illustrated in FIG. 4A in which the lip angle is smaller. Therefore, the tension force of the seal lip 42 with the seal surface 25 can be made smaller as the lip angle of the lip tip portion 53 is smaller. Thus, in the present embodiment, as described above, the lip angle (inclination angle P1) is made small. Specifically, the lip angle (the inclination angle P1 illustrated in FIGS. 2 and 3) is an acute angle of less than 60 degrees.

If the lip angle (inclination angle P1) is made excessively small, the width (axial dimension) of the seal lip 42 as a whole may be so large in order to secure the length L3 (L4) of the lip tip portion 53 (see FIG. 3). Thus, in the present embodiment, the bend angle Q1 (inferior angle; see FIG. 2) between the lip base portion 51 and the lip middle portion 52 is made small as described above. Specifically, the bend angle Q1 is an acute angle of less than 90 degrees. In addition, the length L3 (see FIG. 3) of the lip tip portion 53 is made large. Specifically, the length L3 of the lip tip portion 53 is made larger than the length L1 of the lip base portion 51 (L3>L1). The length L3 of the lip tip portion 53 is easily set to be larger by making the bend angle Q1 smaller. With this configuration, an increase in axial dimension of the seal lip 42 can be suppressed, as will be described below with reference to FIG. 5.

Figure 5A:
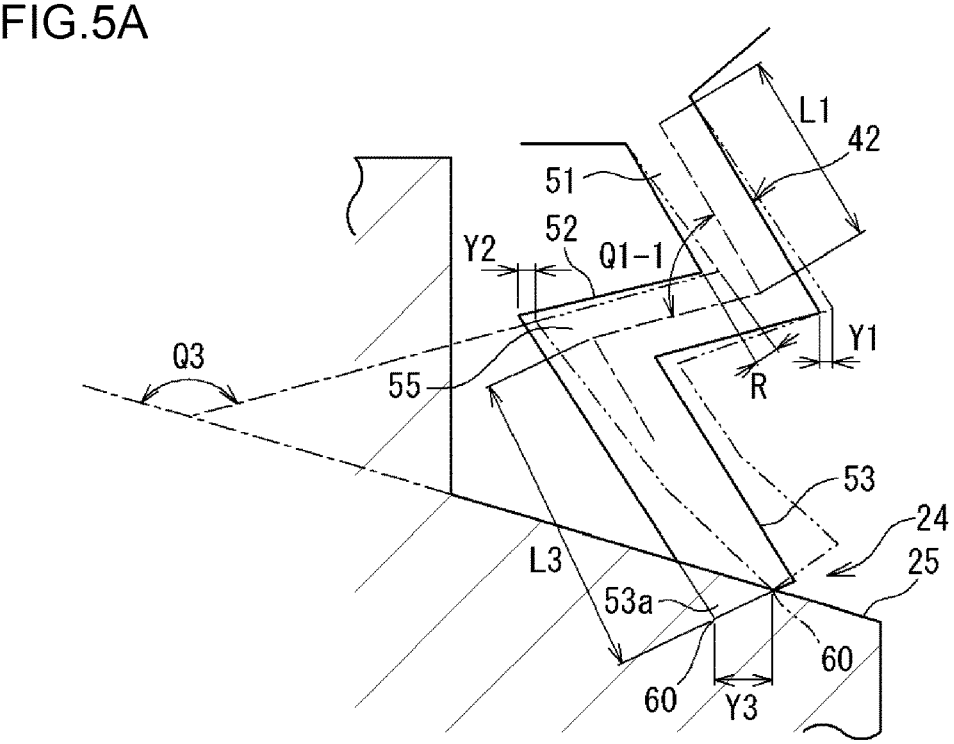
Figure 5B:
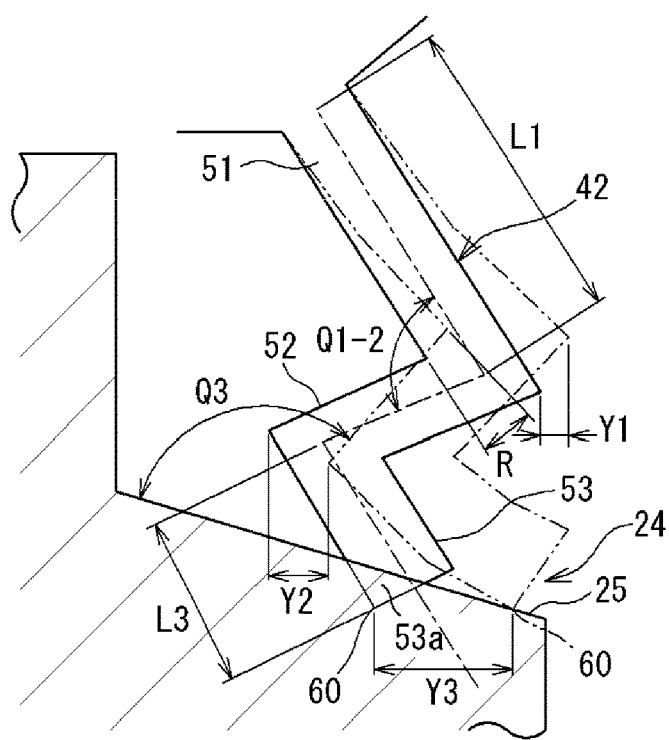

FIGS. 5A and 5B illustrate the seal lip 42. FIG. 5A illustrates a third example, and FIG. 5B illustrates a fourth example. In FIGS. 5A and 5B, when the lip tip portion 53 contacts the seal surface 25, the seal lip 42 is elastically deformed. The state before the deformation (natural state) is indicated by the continuous line, and the state after the deformation is indicated by the long dashed double-short dashed line. In FIGS. 5A and 5B, the bulged shape of the distal end portion 53a is not illustrated. A bend angle Q1-1 between the lip base portion 51 and the lip middle portion 52 in the third example illustrated in FIG. 5A is smaller than a bend angle Q1-2 in the fourth example illustrated in FIG. 5B (Q1-1<Q1-2). In the third example illustrated in FIG. 5A, the length L3 of the lip tip portion 53 is larger than the length L1 of the lip base portion 51 (L3>L1). In the fourth example illustrated in FIG. 5B, on the contrary, the length L3 of the lip tip portion 53 is smaller than the length L1 of the lip base portion 51 (L3<L1). As illustrated in FIGS. 5A and 5B, when the lip tip portion 53 contacts the seal surface 25, the seal lip 42 is elastically deformed. In this case, an amount of displacement Y1 of the lip base portion 51 toward the bearing outside portion is smaller in the third example illustrated in FIG. 5A than that in the fourth example illustrated in FIG. 5B. An angle of deformation (inclination angle of deformation) R of the lip base portion 51 is smaller in the third example illustrated in FIG. 5A than that in the fourth example illustrated in FIG. 5B. Therefore, in the third example illustrated in FIG. 5A, an angle Q3 of the lip middle portion 52 with respect to the seal surface 25 is larger and the coupling portion 55 between the lip middle portion 52 and the lip tip portion 53 is easily deformed in the radial direction. Therefore, in the third example illustrated in FIG. 5A, an amount of displacement Y2 of the coupling portion 55 in the axial direction is smaller. Correspondingly, an amount of displacement Y3 of the lip tip portion 53 in the axial direction can be made smaller. In the fourth example illustrated in FIG. 5B, on the contrary, the amount of displacement Y1 of the lip base portion 51 toward the bearing outside portion is larger. The inclination angle of deformation R of the lip base portion 51 is larger, and thus the amount of displacement Y3 of the lip tip portion 53 in the axial direction is larger (than that in the third example).

From the above, the bend angle (Q1-1) between the lip base portion 51 and the lip middle portion 52 is preferably small, as in the third example illustrated in FIG. 5A, from the viewpoint of reducing the axial width of the seal lip 42. The length L3 of the lip tip portion 53 may be smaller than the length L1 of the lip base portion 51 (L3<L1). However, the length L3 is preferably larger than the length L1 (L3>L1). This reduces the axial width of the seal lip 42 after being deformed. Therefore, the seal groove 24 can be made small, and the lip tip portion 53 can be prevented from projecting out of the seal groove 24. The length L3 and the length L1 may be equal to each other.

In the present embodiment, as described above (see FIG. 2), the bend angle Q2 (inferior angle) between the lip middle portion 52 and the lip tip portion 53 is an acute angle of less than 90 degrees. In the case where the bend angle Q2 is an angle of 90 degrees or more (not illustrated), the lip angle of the lip tip portion 53 (the inclination angle P1 of the lip tip portion 53 with respect to the seal surface 25) is large. If the lip angle is large, it is difficult to reduce the tension force of the seal lip 42 with the seal surface 25 as described in relation to FIG. 4. In the present embodiment, however, the lip angle is made smaller by making the bend angle Q2 smaller. Consequently, the amount of deformation of the lip tip portion 53 is reduced, which makes it possible to further reduce the tension force.

As illustrated in FIG. 2, the lip tip portion 53 has an inclined shape to extend toward the bearing outside portion as the lip tip portion 53 extends closer to the seal surface 25, and is shaped so as to contact the seal surface 25 at the inclination angle P1. Therefore, in assembling the rolling bearing 1 (see FIG. 1), the seal device 6 is caused to approach an assembly in which the balls 4 are disposed between the inner ring 2 and the outer ring 3 in the axial direction from the bearing outside portion side. When the seal device 6 is attached to this assembly (outer ring 3), the seal lip 42 is in an appropriate attitude. This achieves good assemblability. If the direction of inclination of the lip tip portion 53 is opposite (i.e. the lip tip portion 53 has an inclined shape to extend toward the bearing inside portion as the lip tip portion 53 extends closer to the seal surface 25) (not illustrated), the lip tip portion may be flipped over because of the contact resistance (sliding resistance) with the seal surface in the case where the thus configured seal device is caused to approach the assembly in the axial direction from the bearing outside portion side to be attached. In the present embodiment, however, the lip tip portion 53 is not flipped over in this way.

In the seal lip 42 illustrated in FIG. 2, the lip base portion 51 has an inclined shape to extend toward the bearing outside portion as the lip base portion 51 extends away from the seal body portion 41. Further, the lip middle portion 52 is shaped to extend such that the coupling portion 54 with the lip base portion 51 is positioned on the bearing outside portion side and the coupling portion 55 with the lip tip portion 53 is positioned on the bearing inside portion side. The lip tip portion 53 extends toward the bearing outside portion as the lip tip portion 53 extends closer to the seal surface 25. With this configuration, the lip middle portion 52 and the lip tip portion 53 are positioned on the inner ring 2 side of the lip base portion 51, which can make the seal lip 42 compact in the axial direction.

The seal groove 24 has the groove bottom surface 26 which serves as the seal surface 25, and the groove side surface 27 on the bearing inside portion side with respect to the groove bottom surface 26. The lip tip portion 53 contacts the groove bottom surface 26. Therefore, even if the inner ring 2 and the outer ring 3 are displaced relative to each other in the axial direction with an axial load acting on the rolling bearing 1 or the like, the interference of the lip tip portion 53 with respect to the seal surface 25 is varied only slightly. In the case where the seal lip 42 (lip tip portion 53) contacts the groove side surface 27, the interference therebetween can be increased and reduced beyond expectation if the inner ring 2 and the outer ring 3 are displaced relative to each other in the axial direction. If the interference is increased, the rotational resistance is increased. If the interference is reduced to be less than zero (if the interference becomes negative), a clearance is formed to lower the seal performance. With the configuration of the present embodiment, however, the interference is not (substantially) varied even if the inner ring 2 and the outer ring 3 are displaced relative to each other in the axial direction, and the interference can be prevented from becoming zero (or negative).

The groove bottom surface 26 is an inclined surface with an outside diameter that becomes smaller (that extends away from the seal body portion 41) toward the bearing outside portion. Therefore, the angle (lip angle) between the groove bottom surface 26 and the lip tip portion 53 can be made small. Consequently, the amount of deformation of the lip tip portion 53 is reduced, which makes it possible to further reduce the tension force.

In the present embodiment, an angle Q4 of a back surface 52*b* of the lip middle portion 52 on the bearing inside portion side with respect to a virtual line K2 that is parallel to the central axis C (see FIG. 1) of the rolling bearing 1 and that passes through an intersection point between a back surface 51*b* of the lip base portion 51 on the bearing inside portion side and the back surface 52*b* of the lip middle portion 52 on the bearing inside portion side in a sectional surface including the central axis C (see FIG. 3) is larger than zero. This is for the convenience of mold removal during molding of the seal device 6, since the seal device 6 is molded using a mold that is divided in the axial direction. If the angle Q4 is negative, that is, if the back surface 52*b* of the lip middle portion 52 is positioned on the outer ring 3 side with respect to the virtual line K2, a mold that is divided in the axial direction cannot be removed (the seal device 6 cannot be molded).

The embodiment disclosed above is exemplary in all respects, and not limiting. That is, the rolling bearing according to the present invention is not limited to the illustrated embodiment, and may be in other embodiments without departing from the scope of the present invention. In the embodiment described above, the rolling bearing 1 is a deep-groove ball bearing. However, the rolling bearing 1 may be an angular contact ball bearing, and may be a roller bearing in which rolling elements are rollers.

In the embodiment described above, the inner ring 2 is a rotary ring, and the outer ring 3 is a stationary ring. On the contrary, however, the inner ring 2 may be a stationary ring, and the outer ring 3 may be a rotary ring. In this case, although not illustrated, the seal body portion of the seal device is attached to the inner ring. The seal lip is provided so as to extend from the seal body portion toward the outer ring to contact a seal surface of the outer ring. The seal lip has a stepped shape with a plurality of bent portions. That is, the stepped shape (see FIGS. 2 and 3) of the seal lip 42 described above in relation to the embodiment is applicable to a rolling bearing in which one of the inner ring and the outer ring is a rotary ring and the other is a stationary ring.

With the rolling bearing according to the present invention, the seal lip can be made long, even if the space is limited, to reduce the tension force with the seal surface. Therefore, a rotational resistance caused when the seal lip contacts the rotary ring can be reduced.

What is claimed is:

1. A rolling bearing comprising:
a seal device provided at an axial end portion of an annular space formed between an inner ring and an outer ring, one of the inner ring and the outer ring serving as a rotary ring and the other serving as a stationary ring, the seal device including:
a seal body portion attached to the stationary ring, and
a seal lip extending from the seal body portion toward the rotary ring, the seal lip being configured to contact a seal surface of the rotary ring, and the seal lip having (i) a lip base portion that extends from the seal body portion toward the rotary ring, the lip base portion extending toward a bearing outside portion in an axial direction of the inner ring as the lip base portion extends away from the seal body portion, (ii) a lip middle portion that extends from the lip base portion in a direction that is different from a direction in which the lip base portion extends, and (iii) a lip tip portion that extends from the lip middle portion toward the rotary ring in a direction that is different from the direction in which the lip middle portion extends and that has a lip distal end that contacts the seal surface, the lip tip portion extending toward the bearing outside portion in the axial direction of the inner ring as the lip tip portion extends closer to the seal surface, and the lip tip portion contacts the seal surface at an inclination angle, wherein:
the lip middle portion extends such that a coupling portion with the lip base portion is positioned on a side of the bearing outside portion in the axial direction of the inner ring and a coupling portion with the lip tip portion is positioned on a side of a bearing inside portion in the axial direction of the inner ring with respect to the coupling portion with the lip base portion.

2. The rolling bearing according to claim 1, wherein a seal groove is formed at an axial end portion of the rotary ring, the seal groove has a groove bottom surface that serves as the seal surface and a groove side surface located on a side of the bearing inside portion with respect to the groove bottom surface, and the lip tip portion contacts the groove bottom surface.

3. The rolling bearing according to claim 2, wherein the groove bottom surface is an inclined surface that extends away from the seal body portion toward the bearing outside portion.

4. The rolling bearing according to claim 1, wherein a lip angle that is between the seal surface and the lip tip portion is an acute angle of less than 60 degrees.

5. The rolling bearing according to claim 1, wherein a bend angle that is between the lip base portion and the lip middle portion is an acute angle of less than 90 degrees.

6. The rolling bearing according to claim 1, wherein a bend angle that is between the lip middle portion and the lip tip portion is an acute angle of less than 90 degrees.

* * * * *